United States Patent
Stewart et al.

(10) Patent No.: US 10,514,889 B2
(45) Date of Patent: Dec. 24, 2019

(54) MULTIPATTERN REGULAR EXPRESSION SEARCH SYSTEMS AND METHODS THEREFOR

(71) Applicant: Stroz Friedberg, LLC, New York, NY (US)

(72) Inventors: Jon Stewart, New York, NY (US); Joel Uckelman, Durham (GB)

(73) Assignee: Stroz Friedberg, LLC, New York, NY (US)

( * ) Notice: Subject to any disclaimer, the term of this patent is extended or adjusted under 35 U.S.C. 154(b) by 207 days.

(21) Appl. No.: 15/664,056

(22) Filed: Jul. 31, 2017

(65) Prior Publication Data

US 2018/0181373 A1    Jun. 28, 2018

Related U.S. Application Data

(63) Continuation of application No. 15/076,859, filed on Mar. 22, 2016, now Pat. No. 9,720,647, which is a continuation-in-part of application No. 13/786,207, filed on Mar. 5, 2013, now Pat. No. 9,299,026.

(60) Provisional application No. 61/607,288, filed on Mar. 6, 2012.

(51) Int. Cl.
*G06F 17/00* (2019.01)
*G06N 5/02* (2006.01)
*G06F 7/02* (2006.01)

(52) U.S. Cl.
CPC .................. *G06F 7/02* (2013.01); *G06N 5/02* (2013.01); *G06F 2207/025* (2013.01)

(58) Field of Classification Search
None
See application file for complete search history.

(56) References Cited

U.S. PATENT DOCUMENTS

| | | |
|---|---|---|
| 9,299,026 B2 | 3/2016 | Stewart et al. |
| 9,720,647 B2 | 8/2017 | Stewart et al. |
| 2008/0271141 A1* | 10/2008 | Goldman ............ H04L 63/0245 726/22 |

(Continued)

OTHER PUBLICATIONS

Stewart et al., "Searching Massive Data Streams Using Multipattern Regular Expressions", Jan. 21-Feb. 2, 2011, 7th IFIP WG 11.9 International Conference on Digital Forensics, pp. 49063 (Year: 2011).*

(Continued)

*Primary Examiner* — Paulinho E Smith
(74) *Attorney, Agent, or Firm* — Gardella Grace P.A.

(57) ABSTRACT

This disclosure relates generally to a tool, system, and method for searching input data. The system may include a pattern input module, configured to receive regular expression patterns of symbols. An interpreter module may be configured to access individual ones of the symbols of the input data and upon accessing each symbol and compare a thread against the symbol. For each pattern, the thread corresponding to the pattern is compared against the symbol prior to the at least one thread being compared against a subsequent symbol of the input data. An output module may be configured to output an indication of ones of the patterns determined to be contained within the input data based on the comparison of the corresponding at least one thread to the symbols of the input data.

20 Claims, 6 Drawing Sheets

(56) References Cited

U.S. PATENT DOCUMENTS

| | | | |
|---|---|---|---|
| 2009/0213234 A1* | 8/2009 | Chen | H04N 5/23248 348/208.4 |
| 2012/0254203 A1* | 10/2012 | Stewart | G06F 21/6209 707/755 |
| 2013/0246324 A1* | 9/2013 | Stewart | G06N 5/02 706/46 |
| 2016/0274865 A1 | 9/2016 | Stewart et al. | |

OTHER PUBLICATIONS

"U.S. Appl. No. 13/786,207, Non Final Office Action dated Apr. 10, 2015", 12 pgs.
"U.S. Appl. No. 13/786,207, Notice of Allowance dated Nov. 18, 2015", 6 pgs.
"U.S. Appl. No. 13/786,207, Response filed Oct. 12, 2015 to Non Final Office Action dated Apr. 10, 2015", 9 pgs.
"U.S. Appl. No. 15/076,859, Non Final Office Action dated Aug. 26, 2016", 14 pgs.
"U.S. Appl. No. 15/076,859, Notice of Allowance dated Jan. 3, 2017", 5 pgs.
"U.S. Appl. No. 15/076,859, Preliminary Amendment filed Mar. 24, 2016", 7 pgs.
"U.S. Appl. No. 15/076,859, PTO Response to Rule 312 Communication dated Jun. 29, 2017", 2 pgs.
"U.S. Appl. No. 15/076,859, Response filed Nov. 28, 2016 to Non Final Office Action dated Aug. 26, 2016", 9 pgs.
Stewart, et al., "Searching Massive Data Streams Using Multipattern Regular Expressions", 7th IFIP WG 11.9 International Conference on Digital Forensics, (Jan. 31-Feb. 2, 2011), 49-63.

* cited by examiner

MULTIPATTERN REGULAR EXPRESSION SEARCH SYSTEMS AND METHODS THEREFOR

PRIORITY

This application is a continuation of and claims priority to U.S. application Ser. No. 15/076,859 filed Mar. 22, 2016 now U.S. Pat. No. 9,720,647, which is a continuation-in-part of U.S. application Ser. No. 13/786,207 filed Mar. 5, 2013 now U.S. Pat. No. 9,229,026, which claims priority to U.S. Provisional Application No. 61/607,228, which is incorporated herein in its entirety.

TECHNICAL FIELD

The disclosure herein relates generally to multipattern regular expression searches.

BACKGROUND

Regular expression search tools are well known in the art. A regular expression is a pattern that specifies any string of characters or other symbols that meet the terms of the pattern. Regular expressions incorporate a well known syntax, or "literals", with operators that can be utilized to specify multiple strings that may match the pattern, also known as the "language" of the regular expression. For instance, the pattern "ab*c" would be met by strings "ac", "abc", "abbc", etc. Such regular expression search tools can be used to search an input data for fragments of the input data that meet the regular expression pattern.

DRAWINGS

DESCRIPTION

Figure 1:
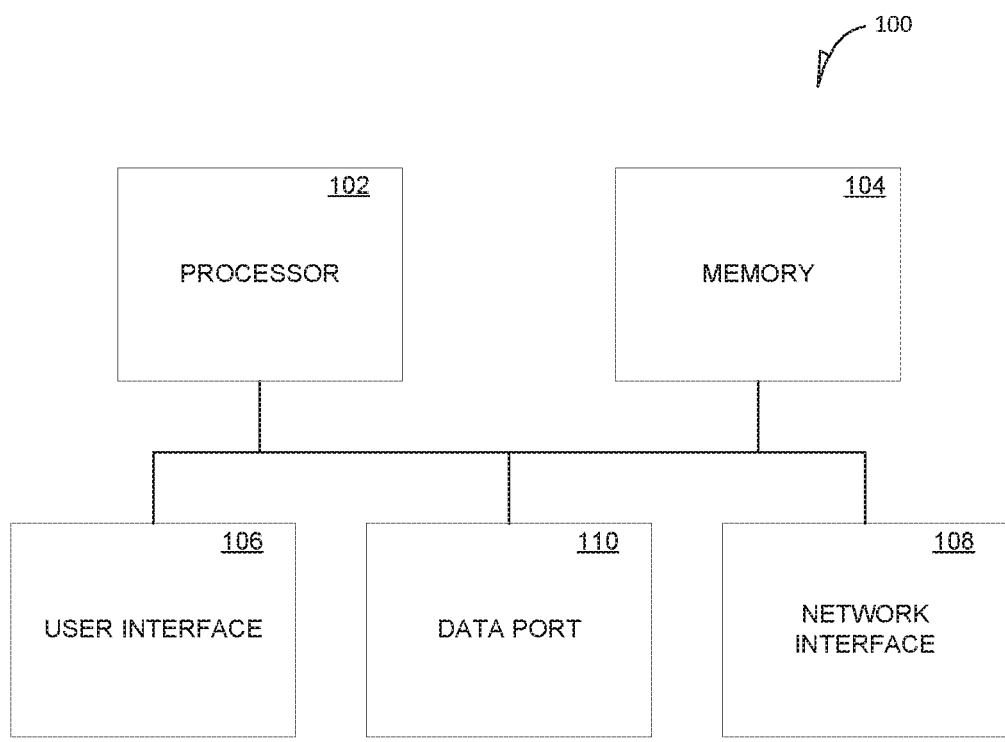
FIG. 1 is a block diagram of an example search tool.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

While digital forensic investigations may involve searching for hundreds or thousands or more of keywords and patterns, certain regular expression search tools focus on searching line-oriented text files with a single regular expression. Certain tools may search for one pattern at a time, with the input data being search completely through once for every pattern. Alternatively, patterns may be joined in a single search, but individual patterns are prioritized over other patterns. Thus, to the extent that the search tool identifies or begins to identify a match for a first regular expression in the text file, the search tool may not identify a second regular expression that overlaps the first regular expression in the text file. As a result, while a single search may incorporate multiple regular expressions in a single search, such search tools may be sensitive to only one expression at a time.

A search tool has been developed for digital forensic investigations that include multipattern searches with matches labeled by pattern, relatively efficient scaling to incorporate increased numbers of patterns, permits support for large binary streams and long matches, and supports multiple encodings for a single pattern, such as UTF-8, UTF-16 and legacy code pages. A multipattern engine of the search tool may identify all the occurrences of patterns in a byte stream, even if some matches overlap. The patterns may have full use of the regular expression syntax, and may not be limited to fixed strings.

In a conventional search tool, as more patterns are added to a search, the time to conduct the search may increase generally linearly with the number of patterns. Thus, all other variables being the same, doubling the number of search terms may approximately double the time to conduct the search. The search tool disclosed herein may not require linear increases in search time to search for more patterns, so that it may be faster to search for all the patterns in a single pass of the data than to perform multiple search passes for individual or groups of patterns.

The search tool may further search byte streams larger, and in certain examples many times larger, than available system memory and to track pattern matches that may be hundreds of megabytes or more long. Further, because digital forensic data may tend to be unstructured, it may be necessary to search for occurrences of the same patterns in different encodings. Concurrent searching for multiple encodings has both general relevance, as text is often encoded according to various code sets, and in particular circumstances, such as when searching for text in foreign languages, where numerous encodings exist.

Search Tool

FIG. 1 is a block diagram of an example search tool 100. As illustrated, the search tool 100 includes a processor 102 configured to execute an automaton against input data to be searched as disclosed in detail herein. The processor 102 may be one or more processors, microprocessors, controllers, or other programmable devices, may be or include a single- or multiple-core microprocessor, and may be distributed among multiple platforms as known in the art. In such examples, the processor 102 may include a controller for controlling distributed processing among multiple individual processors.

As illustrated, the search tool 100 further includes memory 104. The memory 104 may include various volatile and non-volatile electronic memory technologies known in the art, including various types of random access memory (RAM) and read-only memory (ROM). The memory 104 may be understood to include cache memory of the processor 102 as well, and/or electronic data storage, such as a hard drive.

The search tool 100 further includes a user interface 106 configured to output an indication of a result of the search tool 100, among other input and output functions. The user interface 106 variously includes a visual display, an input device, such as a keyboard, a mouse, trackball or other related device, a touchscreen, a printer, and, in various examples, an electronic data output, such as may output an electronic file for accessing by an electronic device.

The search tool 100 further optionally includes one or more of a network interface 108 and a data port 110. The network interface 108 may be a wired or wireless network interface as well known in the art. The network interface 108 may be utilized as part of the user interface 106, such as may be utilized to transmit data to and receive commands from a remote user interface 106. The network interface 108 may further be utilized to obtain input data for analysis by the search tool 100 and output results from the search tool 100. The data port 110 may be any port or mechanical interface that may interface with a data storage device, including, but not limited to, a connector for a hard drive, a disk drive, a port, such as a USB port or other port that may interface with a portable storage device, or a socket or electrical contact to which a chip including input data may be connected or hard-wired so as to obtain data contained thereon.

In various examples, the input data is the complete or essentially complete information contained on or by a particular data storage device, such as a hard drive. In an example, the input data may include both data that would conventionally be accessible by a user of the hard drive, such as files and other data deliberately stored by a user of the hard drive, as well as file systems and various metadata of the hard drive. Consequently, the input data may include various types and configurations of data. In various further examples, the input data may be obtained from alternative sources, such as wireless data that may have been received by an intended destination or intercepted.

The search tool 100 may be or include dedicated and/or custom hardware and software configured to conduct searches of input data as disclosed in detail herein. The search tool 100 may be a proprietary configuration of commercially available hardware. Alternatively or additionally, the search tool 100 may be implemented on commercially available hardware systems, such as personal computers, work stations, servers, and combinations thereof.

System

Figure 2:
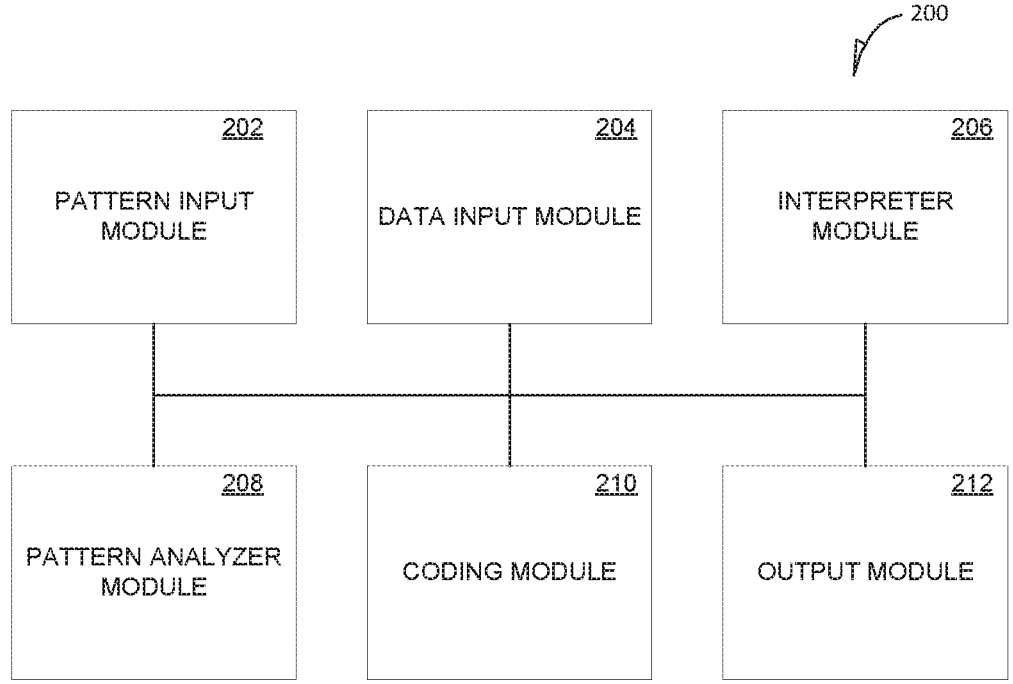
FIG. 2 is a block diagram of a system that may include or implement the search tool of FIG. 1.

FIG. 2 is a block diagram of a system 200 that may include or implement the search tool 100. The system 200 is drawn to refer to those components and systems involved in performing specific aspects of searching operations as modules. While the modules are drawn with specificity, it is to be understood that, for a given search tool 100 and system 200, specific elements may perform tasks or operations relevant to the various search operations and thus, dependent upon certain circumstances, may be understood as variously corresponding to or being assigned to particular modules, such as on a permanent, temporary, or ad hoc basis. The modules may include hardware, such as corresponds to the search tool 100, as well as software that implement various aspects of the search tool 100 and coordinate among various hardware components of the search tool 100.

A pattern input module 202 may include the memory 104, the user interface 106, the network interface 108 and/or the data port 110. The pattern input module 202 may receive patterns that a user of the search tool 100 and the system 200 may wish to determine is or is not present in input data, such as may be obtained from the network interface and/or the data port 110. The patterns may be or include regular expression patterns of symbols. The pattern input module 202 may store the various regular expression patterns in the memory 104.

A data input module 204 may include the user interface 106, the network interface 108, and/or the data port 110. The data input module 204 may obtain the input data. The input data may be obtained serially or in a block. The input data may be provided from the data input module 204 to other modules and/or the processor 102 and memory 104. The provision of the input data from the data input module 204 to other components of the search tool 100 and the system 200 may be serial and may, in various examples, be effectively concurrent with the obtaining of individual symbols of the input data in the first instance.

An interpreter module 206 may include the processor 102 and the memory 104. The interpreter module 206 may access individual ones of the symbols, such as upon each symbol of the input data being obtained serially. The interpreter module 206 may, upon accessing each symbol, compare at least one thread against the symbol as disclosed herein. The at least one thread may be based on at least one of the patterns as obtained by the pattern input module 202, and each pattern may correspond to at least one of the threads. For each pattern, the at least one thread corresponding to the pattern may be compared against the symbol prior to the at least one thread being compared against a subsequent symbol of the input data, as disclosed in detail herein.

A pattern analyzer 208 may include the processor 102 and the memory 104. The pattern analyzer 208 may generate an automaton as disclosed herein. A coding module 210 may include the processor 102 and the memory 104 and may generate a pattern according to a pattern as input by the pattern input module 202 and various encodings, as disclosed herein.

An output module 212 may include the memory 104, the user interface 106, the network interface 108, and a data port 110. The output module 212 may be configured to output an indication of a match of certain patterns in the input data. The output may be relatively simple, such as a message that at least one pattern was found in the input data, or may be relatively complex, such as which patterns were found in the input data, where the patterns were found, the context of the patterns within the input data, and so forth.

Finite Automata

Figure 3:
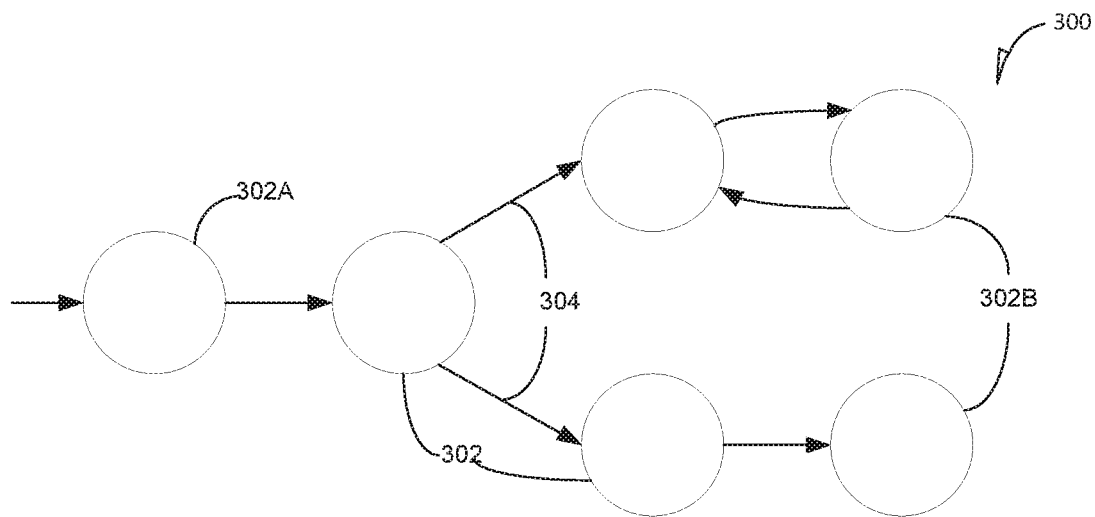
FIG. 3 is an illustration of a finite automaton.

FIG. 3 is an illustration of a finite automaton 300. In various examples, the finite automaton 300 may consist of a set of states 302, one of which is the initial state 302A, and some of which may be terminal states 302B. Pairs of states 302 may have one or more transitions 304 from one state 302 to the other. Each transition 304 may correspond to symbol in the input data. A symbol of the input data may range from a single bit, a single byte, a combination of bytes that corresponds to a particular character, or other discrete and/or definable collection of data that may correspond to identifiable information.

A finite automaton 300 may be generated by the pattern analyzer 208 and may be implemented by the interpreter module 206. The finite automaton 300 may read characters from the input data. The interpreter module 206 may step through an automaton 300 as part of a search of the input data. Stepping through the automaton may generate a current state 302 of the finite automaton 300, which may change as the interpreter module 206 follows transitions 304 with labels that match the symbols read from the input data. If a terminal state 302B is reached, the finite automaton 300 has matched a pattern corresponding to the automaton 300 with the input data. If a non-terminal state 302 is reached that has no transition 304 for the current symbol, the finite automaton 30 has not matched the pattern with the input. A finite automaton 300 may be defined as a deterministic finite automaton (DFA) if no state 302 has two or more outgoing transitions 304 with the same label; otherwise, the automaton 300 may be a nondeterministic finite automaton (NFA). In various examples, every NFA has an equivalent regular expression, and vice versa.

Multipattern searching may apply tagged transitions 304 to the pattern matches, in contrast to applying tagged transitions to submatches. For instance, instead of using an array of submatch positions in the automaton 300, each state 302 may have one or more scalar values for the starting offset of the match, ending offset and value of the last tagged transition 304. Transitions 304 may be tagged to match states 302 with the corresponding index numbers of the patterns. In an example, the baseline complexity of an NFA search may using the search tool 100 be O(nm), where in is the number of patterns and m is the length of the input data. In various examples, several practical optimizations as disclosed herein may be incorporated in the search tool 100 to improve performance over the baseline complexity by utilizing relatively large automata 300.

In an example, instead of using an NFA directly, the search tool 100, such as the interpreter module 206, may compile patterns into a command sequence using commands such as: literal c; fork n; jump n; match n; and halt. literal c may increment an instruction and suspend a current thread if the current symbol is c, or, otherwise, terminate the current thread. fork n may create a new thread at instruction n at the current offset and increment the instruction. jump n may go to instruction n. match n may record a match for pattern n ending at the current offset and increment the instruction. halt may terminate the current thread and report a match, such as may be output by the output module 212, if a match exists. Given a list of patterns to match from the pattern input module 202 and a stream of input from the data input module 204, a thread of the search tool 100 may then be executed by an interpreter module 206 to produce a list of matches.

In an example, each thread is a tuple (s, i, j, k) where s is the current instruction, i is the start (inclusive) of a matched pattern with the input data, j is the end (exclusive) of the match, and k is the index of the matched pattern. In an example, when a thread is created, it is initialized to ⟨0, ∅, ∅⟩ where p is the current position in the input data. A zero (0) for the start or end of a match indicates that a match starts or ends at offset 0; a null (∅) indicates no match.

Example Implementation

Figure 4:
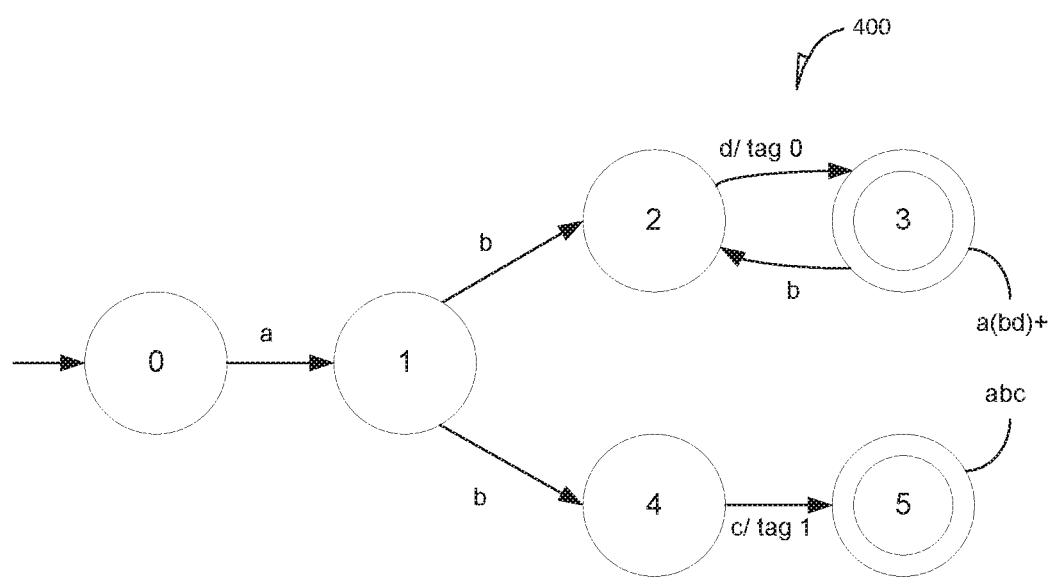
FIG. 4 is a nondeterministic finite automaton (NFA) for an exemplary sequence.

FIG. 4 is a nondeterministic finite automaton (NFA) 400 for an exemplary sequence utilizing an example of the search tool 100. An exemplary input data is qabcabdbd. Exemplary search patterns are "a (bd)+" and "abc". The command sequence or "bytecode" corresponding to the automaton 400 for such search patterns is:

0 literal "a"
1 fork 6
2 literal "b"
3 literal "d"
4 match 0
5 jump 2
6 literal "b"
7 literal "c"
8 match 1
9 halt The commands corresponding to the automaton 400 are executed as the symbol considered in the input data is sequentially advanced one symbol at a time by the interpreter module 206. The leftmost column lists the thread ID, the second column specifies the thread and the third column provides an explanation of the step.

1: qabcabdbd
  0  ⟨0, 0, ∅, ∅⟩  thread 0 created
  0  ⟨0, 0, ∅, ∅⟩  literal "a" fails; thread terminates
2: qabcabdbd
  1  ⟨0, 1, ∅, ∅⟩  thread 1 created
  1  ⟨0, 1, ∅, ∅⟩  literal "a" succeeds
  1  ⟨0, 2, ∅, ∅⟩  advance instruction and suspend
3: qabcabdbd
  2  ⟨0, 2, ∅, ∅⟩  thread 2 created
  2  ⟨0, 2, ∅, ∅⟩  literal "a" fails; thread terminates
  1  ⟨1, 1, ∅, ∅⟩  fork 6 creates thread 3
  3  ⟨6, 1, ∅, ∅⟩  thread 3 created
  1  ⟨2, 1, ∅, ∅⟩  advance instruction
  1  ⟨2, 1, ∅, ∅⟩  literal "b" succeeds
  1  ⟨3, 1, ∅, ∅⟩  advance instruction and suspend
  3  ⟨6, 1, ∅, ∅⟩  literal "b" succeeds
  3  ⟨7, 1, ∅, ∅⟩  advance instruction and suspend
4: qabcabdbd
  4  ⟨0, 3, ∅, ∅⟩  thread 4 created
  4  ⟨0, 3, ∅, ∅⟩  literal "a" fails; thread terminates
  1  ⟨3, 1, ∅, ∅⟩  literal "d" fails; thread terminates
  3  ⟨7, 1, ∅, ∅⟩  literal "c" succeeds
  3  ⟨8, 1, ∅, ∅⟩  advance instruction and suspend
5: qabcqabdbd
  5  ⟨0, 4, ∅, ∅⟩  thread 5 created
  5  ⟨0, 4, ∅, ∅⟩  literal "a" fails; thread terminates
  3  ⟨8, 1, ∅, ∅⟩  match 1
  3  ⟨8, 1, 4, 0⟩  set match pattern and end offset
  3  ⟨9, 1, 4, 0⟩  advance instruction
  3  ⟨9, 1, 4, 0⟩  halt; reports match on pattern 1 at [1, 4), terminates
6: qabcqabdbd
  6  ⟨0, 4, ∅, ∅⟩  thread 6 created
  6  ⟨0, 4, ∅, ∅⟩  literal "a" succeeds
  6  ⟨1, 5, ∅, ∅⟩  advance instruction and suspend For simplicity, from here on the creation of threads that immediately terminate because of the failure to match the current symbol are not specifically addressed, though one of ordinary skill in the art will recognize that such threads are created based on the commands corresponding to the automaton 400 above and the example of the preceding symbols of the input data.

7: qabcqabdbd
  6  ⟨1, 5, ∅, ∅⟩  fork 6 creates thread 7
  7  ⟨6, 5, ∅, ∅⟩  thread 7 created
  6  ⟨2, 5, ∅, ∅⟩  advance instruction
  6  ⟨2, 5, ∅, ∅⟩  literal "b" succeeds
  6  ⟨3, 5, ∅, ∅⟩  advance instruction and suspend
  7  ⟨6, 5, ∅, ∅⟩  literal "b" succeeds
  7  ⟨7, 5, ∅, ∅⟩  advance instruction and suspend
8: qabcqabdbd
  6  ⟨3, 5, ∅, ∅⟩  literal "d" succeeds
  7  ⟨4, 5, ∅, ∅⟩  advance instruction and suspend
  7  ⟨7, 5, ∅, ∅⟩  literal "c" fails; thread terminates
9: qabcqabdbd
  6  ⟨4, 5, ∅, ∅⟩  match 0
  6  ⟨4, 5, 8, 1⟩  set match pattern and end offset
  6  ⟨5, 5, 8, 1⟩  advance instruction
  6  ⟨5, 5, 8, 1⟩  jump 2
  6  ⟨2, 5, 8, 1⟩  goto instruction 2
  6  ⟨2, 5, 8, 1⟩  literal "b" succeeds
  6  ⟨3, 5, 8, 1⟩  advance instruction and suspend
10: qabcqabdbd
  6  ⟨3, 5, 8, 1⟩  literal "d" succeeds
  6  ⟨4, 5, 8, 1⟩  advance instruction and suspend
11: Having reached the end of the input data, the remaining threads run until they terminate:
  6  ⟨4, 5, 8, 1⟩  match 0
  6  ⟨4, 5, 10, 1⟩  set match pattern and end offset
  6  ⟨5, 5, 10, 1⟩  advance instruction
  6  ⟨5, 5, 10, 1⟩  jump 2
  6  ⟨2, 5, 10, 1⟩  goto instruction 2
  6  ⟨2, 5, 10, 1⟩  literal "b" fails; reports match of pattern 0 at [4, 9); thread terminates The execution of these commands by the interpreter module 206 corresponding to the automaton 400 reports a match for abc at [1, 4) and a match for a(bd)+ at [4, 9). As is illustrated, the single automaton 400 may thereby be utilized, such as by the interpreter module 206, to search for two different patterns in the input data simultaneously. As illustrated, each symbol of the input data is tested only once. Furthermore, it is to be understood that the principles disclosed and/or illustrated herein are scalable, and that an automaton 300 may be constructed based on three or more patterns. As such, the number of patterns that may be searched while testing each symbol of input data only once may be limited only by the resources of the search tool 100 or the system 200, such as by the amount of available memory 104.

It is emphasized that while a testing of each symbol only once may, under various circumstances, reduce the amount of time and resources consumed in comparison with testing some or all symbols more than once, the search tool 100 is not necessarily limited to testing each symbol only once. A search tool that otherwise operates according to the present disclosure that happens to test certain symbols more than once may still generally meet the terms of the present disclosure.

Applying an automaton 300 to input data as disclosed and illustrated herein may support the analysis of input data that is obtained serially. For instance, conventional electronic data storage devices, such as a hard drive, may automatically stream stored data serially. In an example, as each byte is streamed from the electronic data storage device, each byte may be tested upon being obtained by the data input module 204 or upon all of the bytes of a particular character being obtained by the data input module 204. In various examples, input data may be tested against the automaton 300 essentially as quickly as the input data is accessed from a data source. It is to be understood that, even though some or all of the input data may be obtained by the data input module as a block, with any one or more of the symbols being accessible in any order, individual symbols may nevertheless be accessed by the interpreter module 206 from the block of input data and, upon being accessed, tested against the automaton 300.

Thread Creation

As illustrated above, the search tool 100 generally and the interpreter module 206 specifically may minimize thread creation, such as from unnecessary alternation. In various examples, rather than treating each pattern as a separate branch of the automaton 400, at least some patterns may be merged into the automaton 400 as the patterns are parsed to form a trie. A trie, also known as a prefix tree, is a tree whose root corresponds to the empty string, and every other node extends the string of its parent by one symbol. A trie may be a type of acyclic deterministic finite automaton (DFA). The merging may take into account not only the criteria of the transitions 304, but also the sets of source and target states 302B. In an example, a Glushkov nondeterministic finite automaton (NFA) form is utilized by the search tool. See. e.g., Glushkov, "The abstract theory of automata," *Russian Mathematical Surveys*, volume 16(5) (1961), pages 1-53, incorporated herein in its entirety.

Jump Tables

In various examples, one thread is forked to handle each successor of a given state 302. Some NFA 400 states 302 may have a large number of successor states 302, making the creation of new threads costly in terms of time and computing resource consumption. For example, the first state 302 may have a relatively large number k of outbound transitions 304 when many patterns are specified. Therefore, every symbol read from the input stream causes k new threads to be created, almost all of which may terminate immediately due to the lack of a match.

Various examples of the search tool 100 determine the threads that will not terminate prior to reaching at least one subsequent state 302 and spawn only these threads. Such a determination may be made by the interpreter module 206. The interpreter module 206 may produce a jump table, such as a jumptable instruction. In such examples, the jumptable instruction sits at the head of a list of, for instance, two hundred fifty-six (256) consecutive instructions, or one instruction for each possible value of a current byte. When the jumptable instruction is reached with byte b, execution jumps ahead b+1 instructions and continues from there. The instruction offset b+1 from the jumptable may be a jump in the case of a match (in order to get out of the jump table); otherwise, it may be a halt. If more than one transition is possible for byte b, then a list of appropriate fork and jump instructions may be appended to the table and the jump instruction for byte b targets this table. Consequently, in such examples, only the threads that succeed are spawned. The interpreter module 206 may specify jumps to states just beyond their literal instructions, such as to prevent b from being evaluated twice.

In various examples, a sibling instruction, such as jumptable range, may be used when the difference between the minimum and maximum accepted byte values is small, such as from zero (0) to two hundred fifty-six (256) bytes. The sibling instruction may operate by checking that the byte value is in range and only then indexing into the table, for instance, to reduce the table size. In various examples, the range is produced by the coding module 210 and utilized by the interpreter module 206.

State Synchronization

A typical simulation of an automaton 300 may utilize a bit vector (such as containing a bit for each state 302) to track the states 302 that are visited for the current symbol in the input data stream in order to avoid duplicating work. In such a simulation, the number of automaton 300 states 302 may depend on the combined length of the search patterns that are used. Therefore, a search that uses a large number of patterns (even fixed-string patterns) may result in the bit vector being relatively long. In various circumstances, the bit vector is cleared after each new symbol of the input stream is obtained.

However, it may be possible to determine that it may be impossible for two threads to arrive at the same state 302. In various examples, it may be impossible for two threads to arrive at the same state 302 at the same input data symbol position unless the state 302 has multiple transitions 304 leading to it. Therefore, in an example, only the states 302 with multiple predecessor states 302 may utilize bits in the current state vector. In such an example, bits for other states may be omitted.

Consequently, some or all of the states 302 that are susceptible to having multiple threads arrive concurrently may be identified. Based on the identification of such states 302, the susceptible states 302 may include bits in the current state vector while other states may omit such bits. As a result, resources and time may be saved in comparison with including the bits in the current state vector for every state 302.

Various examples of the search tool 100 may associate an index with each state 302 having multiple incoming transitions 304, such as by using a chkhalt instruction. Such an instruction is inserted before outbound transition 304 instructions associated with a state 302 that may utilize synchronization. The index associated with the state 302 may be specified as an operand to chkhalt, which may use the instruction to test the corresponding value in a bit vector. In an example, the bit is set if it is currently unset, and execution proceeds. In such an example, if the bit is already set, then the thread terminates. Consequently, the size of the bit vector may be reduced or otherwise minimized and safe transitions 304, which may occur frequently in practice, may be left unguarded.

Complex Instruction Set

The search tool 100 generally, and the interpreter module 206 specifically, may introduce new instructions to handle common cases. For example, the instruction may have two operands and continue execution if the current byte matches either operand. Similarly, an instruction range may have two operands and continue if the current byte has a value that falls within their range inclusively. More complex symbol classes may be handled with a bitvector instruction, such as an instruction followed by two hundred fifty-six (256) bits, where each bit is set to one if the corresponding byte value is permitted. If several states 302 have the same source and target states 302, their transitions 304 can be collapsed into a single bitvector instruction. In various examples, a new instruction may preferably be introduced if the new instruction can eliminate sources of alternation.

Compilation

Various examples of the search tool 100 may use a hybrid breadth-first/depth-first search scheme for laying out generated instructions. In an example, instructions for states 302 may first be laid out in breadth-first order of discovery; the discovery may switch to a depth-first search when a parent state 302 has a single transition 304. In various examples, advantageously, subsequent states 302 may generally be close to their parent states 302 due to breadth-first discovery. Further, the total number of instructions used may be reduced, in certain circumstances significantly, in linear sequences of states because jump and fork instructions may not be used between them.

Greedy Vs. Non-Greedy Matching

In various circumstances, an example thread may not identify a pattern <html>.*</html> fragments from, for instance, unallocated space in a file system of a hard drive. In an example, though the pattern may match the first fragment, a thread may continue the match attempts, eventually producing a match on the ends of subsequent fragments (if they exist) and reporting one long match.

A repetition operator such as <html>.*?</html> that results in the shortest possible matches may be referred to as a "non-greedy" operator. By executing threads spawned by a fork command before the threads' associated parent threads, it may be possible to control the priority given to an alternation. In contrast, in the above example, .*? may generate one match for each fragment.

Positional Assertions

Input data may include positional assertions in patterns. For example, a pattern may assert that it must match the pattern on a certain line and in a certain column of certain input data, such as a text fie. A file format may have an optional record that may be identified with a pattern, but that is known to occur only at a given offset. Further, searching functions may be limited to data that is sector-aligned. In various examples, the search tool may utilize syntax such as (?i % j@regex) and (?i % j@aregex), where i is either an absolute or modulo byte offset and j is a divisor. In such examples, (?0%512@)PK may match sector-aligned .zip file headers.

Multiple Encodings

Certain regular expression libraries known in the art with Unicode support rely on data to be decoded to Unicode symbols before consideration by the a search routine; the assumption in such circumstances may be that the data to be searched is stored in a single encoding. Such an assumption may not be applicable under various circumstances, such as in digital forensics, when searching unstructured data, encodings may change capriciously between and among a variety of encodings, such as American Standard Code for Information Interchange (ASCII) to Universal Symbol Set Transformation Format-8-bit (UTF-8) and -16-bit (UTF-16) to a legacy code page.

A coded symbol set may be understood to be a list of pairs, each consisting of a symbol and a unique integer representing the symbol, which may be known as a code point. An encoding is a method for mapping sequences of code points to sequences of bytes. Unicode, for example, is a coded symbol set consisting of 1,114,112 code points, intended to be sufficient for representing all text produced by humans. UTF-8 and UTF-16 are encodings capable of representing all Unicode code points as bytes. ASCII, commonly used for simple text files (especially by English speakers), is both a coded symbol set and an encoding—the 128 code points in ASCII numbered 0-127, are directly encoded as bytes 0-127. Numerous encodings specific to one or more natural languages have been developed, such as Shift_JIS, EUC-KR, KOI8-R, and ISO 8859-1.

The multiplicity of encodings means that one piece of text may be presented as bytes in numerous ways. For instance, the text string "IRLIBSYR" can be encoded as in FIG. 8.

Figure 8:
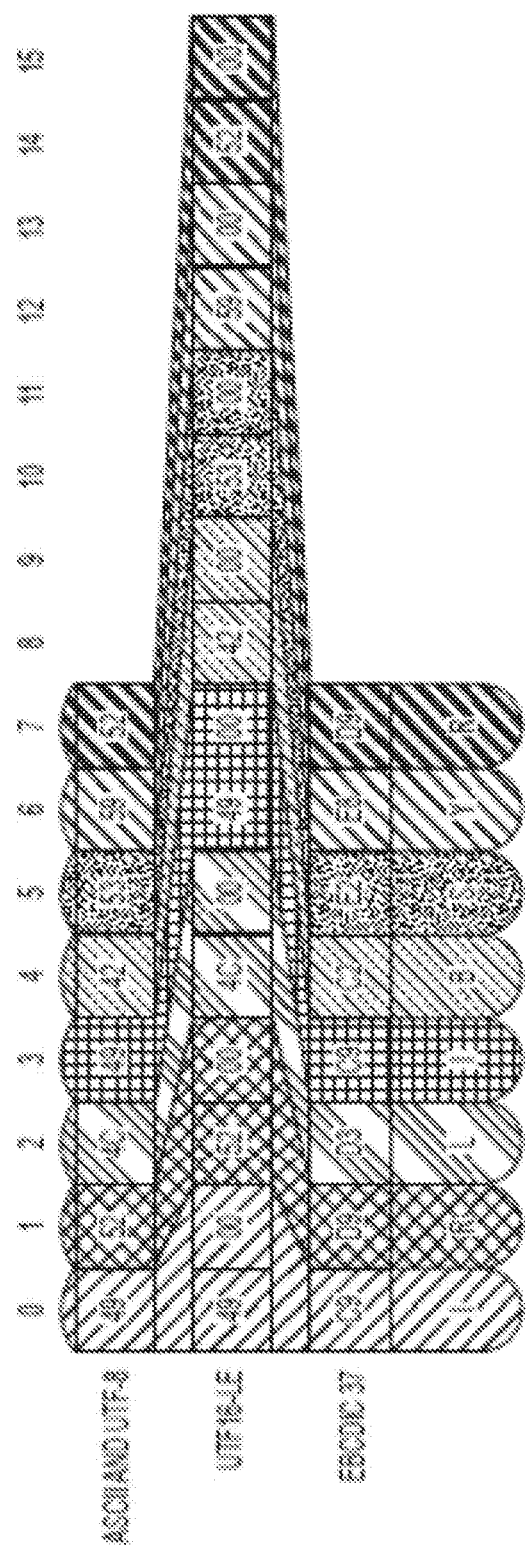
FIG. 8 is a table of multiple encodings.

As illustrated in FIG. 8, the UTF-16LE encoding, while containing values similar to the UTF-8 encoding, is double the length the length of UTF-8, while the EBCDIC 37 encoding may bear little to no resemblance to UTF-16LE and UTF-8. For searching tools that are not sensitive to multiple encodings, searching a block of bytes for "IRLIBSYR" may mean searching for "IRLIBSYR" once for each possible encoding. Hundreds of encodings exist in the art, dozens of which are in common contemporary usage. As such, establishing the existence of a particular pattern within an input data for which the encoding is unknown beforehand may result in vastly expanded effort, an incomplete search, or both of these.

The coding module 210, however, may utilize multiple pattern encoding, resulting in searching in parallel for one pattern rendered in multiple encodings. In various examples, the search tool utilizes the same methodologies for parallel searching of multiple patterns on a single pass of the input data. Hence, in an example, a search for the pattern IRLIBSYR.*?SACPOP in UTF-8, UTF-16LE, UTF-16BE, UTF-32LE, and UTF-32BE does not utilize five passes over the input data (once for each encoding), but merely adds five patterns to the pattern set from which the search automaton 300 is built.

Figure 5:
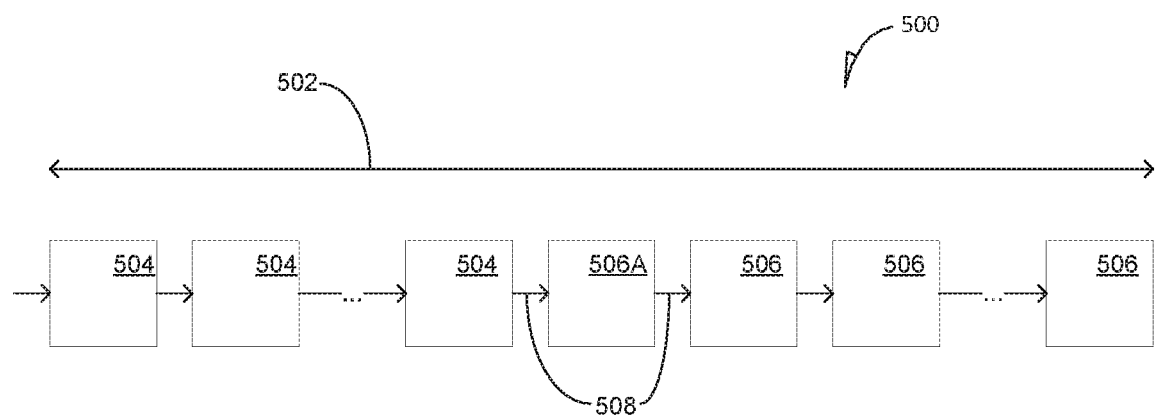
FIG. 5 is an illustration of a code point-code point and byte-byte transformation chain.

FIG. 5 is an illustration of a code point-code point and byte-byte transformation chain 500. As illustrated, the sequence 502 includes code points 504 and bytes 506 transformed in sequence. Symbol encodings may be understood to be a special case of the more general case of transformations that map code points 504 or sequences of code points 504 to code points 504 or sequences of code points 504, and sequences of bytes 506 to sequences of bytes 506, and that such transformations could be chained together, as shown in the sequence 502, such as may produce a transformation 508 from code points 504 to bytes 506. Consequently, the search tool 100 may be sensitive to text which is both encoded and transformed, such as according to a cipher. The byte 506A may represent the transition from code points 504 to bytes 506.

As a result, various examples of the coding module 210 provide for user specification of transformation chains 500. The transformation chain 500 may permit specifying multiple encodings for each pattern. Thus, for instance, a user, by way of the user interface 106 and the coding module 210, may specify the transformation chain UTF-8|OCE to cause each byte in a sequence searched for to first be UTF-8-encoded, then subjected to Outlook Compressible Encryption (OCE) without the user specifically or previously acting on the pattern.

In various examples, the search tool 100 generally and the coding module 210 specifically, is explicitly byte-oriented. In order to search for alternate encodings of a pattern, the various binary representations may be generated as separate patterns in the automaton 300. Matches can then be resolved back to the user-specified term and appropriate encoding using a table.

In various examples, the search tool 100 may search for ASCII-specified patterns as ASCII and as UTF-16. In addition to specifying the particular encodings to be used for a given search term, users may, in various examples, choose an automatic mode, where the symbols of a keyword are considered as Unicode code points. Unique binary representations, such as all related unique binary representations, may then generated from the list of supported ICU encodings, such as in aid of searches for foreign-language keywords.

Figure 6:
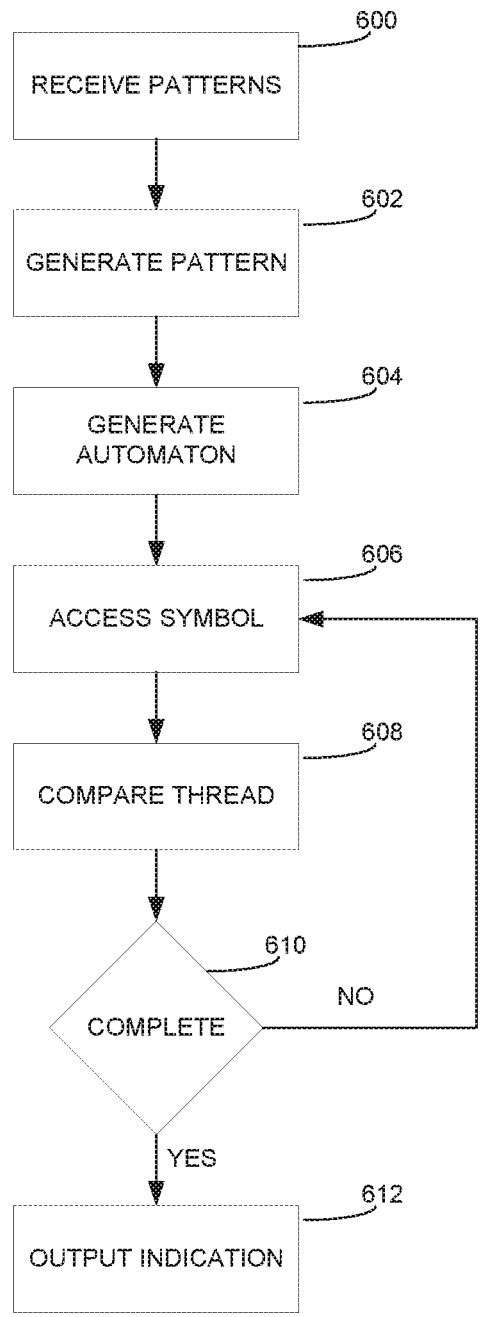
FIG. 6 is a flowchart for searching input data including symbols.

FIG. 6 is a flowchart for searching input data including symbols. The flowchart is discussed with particularity to the search tool 100 and the system 200, though it is to be understood that the flowchart may be implemented with respect to any suitable search tool and/or system. Further, the search tool 100 and system 200 may be utilized according to any of a variety of alternative flowcharts and related methods.

At 600, regular expression patterns of symbols are received, such as by the pattern input module 202. In an example, the pattern as input corresponds to a first encoding. In an example, at least one of the patterns comprises a string of at least one symbol and at least one operator, wherein the operator specifies variable combinations of symbols within the at least one of the patterns.

At 602, another pattern is generated by the coding module 210 according to the pattern as input at 600 and a second encoding different from the first encoding. In an example, a plurality of encodings includes the first and second encodings, and generating a plurality of patterns generates the plurality of patterns corresponding to each encoding of the plurality of encodings not corresponding to the encoding of the pattern as input.

At 604, an automaton 300, 400 corresponding to the patterns is generated by the pattern analyzer 208 based on common symbols between the regular expression patterns.

At 606, one or more symbols of the input data are accessed, such as by the interpreter module 204. The symbols of the input data may be been obtained by the data input module 204.

At 608, at least one thread is compared against the symbol with the interpreter module 206, the at least one thread being based on at least one of the patterns and each of the patterns corresponding to at least one of the threads. In an example, the threads are compared based on the patterns as received by the pattern input module 202 and as generated by the coding module 210. The at least one thread is compared against the symbol prior to the at least one thread being compared against a subsequent symbol of the input data. In various examples, each symbol of the input data is compared against the plurality of threads once before any one symbol is compared against the plurality of threads more than once. In an example, each symbol of the input data is compared against the plurality of threads only once.

In an example, the thread comprises a plurality of discrete instructions and the at least one thread is compared against the symbol by implementing individual ones of the discrete instructions. In an example, each of the patterns corresponds to a common automaton 300, 400 comprising a plurality of commands, and each of the threads is generated based on the automaton 300, 400. In an example, the plurality of commands of the automaton produces the patterns that correspond to the automaton 300, 400.

At 610, the interpreter module 206 and/or the data input module 204 determine if the accessing of the input data is complete. If not, the interpreter module 206 returns to operation 606 and accesses a subsequent symbol.

At 612, if the accessing of the input data is complete, the output module 212 outputs an indication of ones of the patterns determined to be contained within the input data based on the comparison of the corresponding at least one thread to the symbols of the input data. The indication may be an indication that one or more of the patterns has or has not been identified in the input data, which patterns have been identified, where, in what encoding, what data in the input data may be in proximity of the pattern, and so forth.

Figure 7:
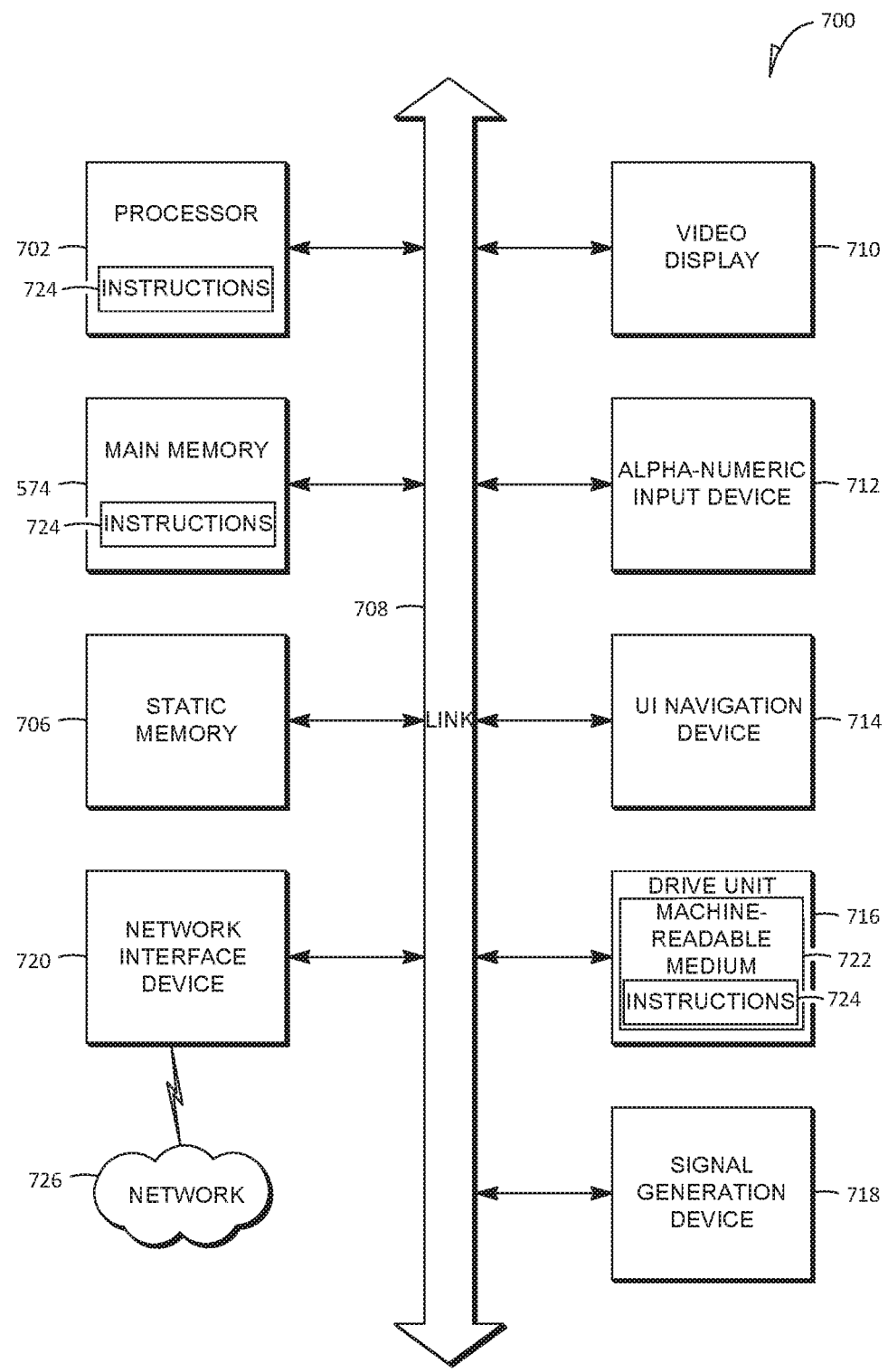
FIG. 7 is a block diagram illustrating components of a machine.

FIG. 7 is a block diagram illustrating components of a machine 700, according to some example examples, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system and within which instructions 724 (e.g., software) for causing the machine 700 to perform any one or more of the methodologies discussed herein may be executed. In alternative examples, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a graphics display 710 (e.g., a plasma display panel (PDP), a light emitting diode (LED) display, a liquid crystal display (LCD), a projector, or a cathode ray tube (CRT)). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media. The instructions 724 may be transmitted or received over a network 726 via the network interface device 720.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 700), such that the instructions, when executed by one or more processors of the machine (e.g., processor 702), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Additional Examples

Example 1 may include subject matter (such as an apparatus, a method, a means for performing acts) that can include a system configured to search input data including symbols. The system may include a pattern input module, configured to receive regular expression patterns of symbols. An interpreter module, configured to access individual ones of the symbols of the input data and, may, upon accessing each symbol, compare at least one thread against the symbol, the at least one thread being based on at least one of the patterns and each of the patterns corresponding to at least one of the threads. For each pattern, the at least one thread corresponding to the pattern is compared against the symbol prior to the at least one thread being compared against a subsequent symbol of the input data. An output module may be configured to output an indication of ones of the patterns determined to be contained within the input data based on the comparison of the corresponding at least one thread to the symbols of the input data.

In Example 2, the system of Example 1 can optionally further include that, for each pattern, each symbol of the input data is compared against the plurality of threads once before any one symbol is compared against the plurality of threads more than once.

In Example 3, the system of any one or more of Examples 1 and 2 can optionally further include that each symbol of the input data is compared against the plurality of threads only once.

In Example 4, the system of any one or more of Examples 1-3 can optionally further include that the thread corresponds to a sequence of commands and wherein the at least one thread is compared against the symbol by implementing individual ones of the plurality of commands.

In Example 5, the system of any one or more of Examples 1-4 can optionally further include that each of the patterns corresponds to a common automaton corresponding to a plurality of commands, the sequence of commands being a subset of the plurality of commands, and wherein each of the threads is generated based on the plurality of commands.

In Example 6, the system of any one or more of Examples 1-5 can optionally further include that the plurality of commands corresponding to the automaton produces the patterns that correspond to the automaton.

In Example 7, the system of any one or more of Examples 1-6 can optionally further include a pattern analyzer configured to generate the automaton corresponding to the patterns based on common symbols between the patterns.

In Example 8, the system of any one or more of Examples 1-7 can optionally further include that a pattern as input by the pattern input module corresponds to a first encoding, and further include a coding module configured to generate another pattern according to the pattern as input and a second encoding different from the first encoding, wherein the interpreter module is configured to compare threads based on the patterns as received by the pattern input module and as generated by the coding module.

In Example 9, the system of any one or more of Examples 1-8 can optionally further include that the coding module is configured with a plurality of encodings including the first and second encodings, and wherein the coding module is configured to generate a plurality of patterns corresponding to each encoding of the plurality of encodings not corresponding to the encoding of the pattern as input.

In Example 10, the system of any one or more of Examples 1-9 can optionally further include that at least one of the patterns comprises a string of at least one symbol and at least one operator, wherein the operator specifies variable combinations of symbols within the at least one of the patterns.

Example 11 may include subject matter (such as an apparatus, a method, a means for performing acts) that can include a method for searching input data including symbols. Regular expression patterns of symbols are received. The symbols of the input data are accessed and, upon accessing each symbol, compared at least one thread against the symbol, the at least one thread being based on at least one of the patterns and each of the patterns corresponding to at least one of the threads. The at least one thread is compared against the symbol prior to the at least one thread being compared against a subsequent symbol of the input data. An indication of ones of the patterns determined to be contained within the input data is outputted based on the comparison of the corresponding at least one thread to the symbols of the input data.

In Example 12, the method of Example 11 can optionally further include that, for each pattern, each symbol of the input data is compared against the plurality of threads once before any one symbol is compared against the plurality of threads more than once.

In Example 13, the method of any one or more of Examples 11 and 12 can optionally further include that each symbol of the input data is compared against the plurality of threads only once.

In Example 14, the method of any one or more of Examples 11-13 can optionally further include that the thread corresponds to a sequence of commands and wherein the at least one thread is compared against the symbol by implementing individual ones of the plurality of commands.

In Example 15, the method of any one or more of Examples 11-14 can optionally further include that each of the patterns corresponds to a common automaton corresponding to a plurality of commands, the sequence of commands being a subset of the plurality of commands, and wherein each of the threads is generated based on the plurality of commands.

In Example 16, the method of any one or more of Examples 11-15 can optionally further include that the plurality of commands corresponding to the automaton produces the patterns that correspond to the automaton.

In Example 17, the method of any one or more of Examples 11-16 can optionally further include generating the automaton corresponding to the patterns based on common symbols between the patterns.

In Example 18, the method of any one or more of Examples 11-17 can optionally further include that a pattern as input by the pattern input module corresponds to a first encoding, and further including generating another pattern according to the pattern as input and a second encoding different from the first encoding, wherein comparing threads is based on the patterns as received and as generated.

In Example 19, the method of any one or more of Examples 11-18 can optionally further include that the coding module is configured with a plurality of encodings including the first and second encodings, and wherein the coding module is configured to generate a plurality of patterns corresponding to each encoding of the plurality of encodings not corresponding to the encoding of the pattern as input.

In Example 20, the method of any one or more of Examples 11-19 can optionally further include that at least one of the patterns comprises a string of at least one symbol and at least one operator, wherein the operator specifies variable combinations of symbols within the at least one of the patterns.

Each of these non-limiting examples can stand on its own, or can be combined with one or more of the other examples in any permutation or combination.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method for identifying a plurality of regular patterns within input data, the method comprising:
   receiving at least one regular pattern;
   for each pattern of the at least one regular pattern,
      applying, by processing circuitry, at least one transformation chain to the respective pattern, transforming the respective pattern into at least one additional pattern, wherein
         applying the at least one transformation chain comprises applying multiple translations including at least one code point to byte translation, and
         each pattern of the at least one additional pattern is encoded in a different encoding format than an encoding format of the respective pattern;
      wherein the plurality of regular patterns comprises, for each regular pattern of the at least one regular pattern, the at least one additional pattern;
   generating, by the processing circuitry, a plurality of threads comprising, for each pattern of the plurality of regular patterns, a respective thread, wherein
      each thread of the plurality of threads comprises a respective sequence of commands;
   iteratively comparing, by the processing circuitry for each symbol of the input data, at least one thread of the plurality of threads to the respective symbol, such that each instance of each pattern of the plurality of regular patterns in the input data is identified as a respective match of a plurality of pattern matches in a single pass of the input data; and
   outputting, by the processing circuitry, an indication of the plurality of pattern matches identified within the input data.

2. The method of claim 1, wherein the plurality of regular patterns further comprises the at least one regular pattern.

3. The method of claim 1, wherein applying a first transformation chain of the at least one transformation chain comprises sequentially applying a first encoding transformation comprising one or more translations followed by a second encoding transformation comprising one or more translations.

4. The method of claim 1, wherein a portion of the plurality of regular patterns comprises at least one operator representing variable combinations of symbols.

5. The method of claim 1, further comprising:
generating, by the processing circuitry, an automaton corresponding to the plurality of regular patterns and comprising at least one common state representing a common symbol shared by two or more of the plurality of regular patterns;
wherein generating the plurality of threads comprises generating the plurality of threads based on the automaton.

6. The method of claim 5, wherein the automaton is a non-finite automaton.

7. The method of claim 1, wherein each thread of the plurality of threads tracks a start of a matched pattern within the input data, and an end of the matched pattern within the input data.

8. The method of claim 1, wherein applying the input data comprises applying the input data as an incoming input data stream.

9. The method of claim 1, wherein the processing circuitry comprises a plurality of hardware-implemented modules each configured to automatically perform at least a portion of the method.

10. The method of claim 1, wherein outputting the indication of the plurality of pattern matches identified within the input data comprises providing, for each match of the plurality of pattern matches, context of the match within the input data.

11. A non-transitory computer readable medium having instructions stored thereon for multi-pattern matching of input data, wherein the instructions, when executed by processing circuitry, cause the processing circuitry to:
for each pattern of a set of regular patterns,
apply at least one transformation chain to the respective pattern, transforming the respective pattern into at least one additional pattern, wherein
applying each transformation chain of the at least one transformation chain comprises applying a respective plurality of translations including at least two of a) a code point to byte translation, b) a code point to code point translation, and c) a byte to byte translation,
wherein a plurality of regular patterns comprises, for each pattern of the set of regular patterns, the at least one additional pattern;
generate a plurality of threads comprising, for each pattern of the plurality of regular patterns, a corresponding thread comprising a plurality of instructions for matching symbols based on the respective pattern; and
apply, for each symbol of the input data, at least one thread of the plurality of threads to the respective symbol;
wherein applying results, for at least a portion of the plurality of regular patterns, in a respective one or more pattern matches within the input data.

12. The non-transitory computer readable medium of claim 11, wherein the instructions, when executed by the processing circuitry, cause the processing circuitry to output an indication of the portion of the plurality of regular patterns identified within the input data.

13. The non-transitory computer readable medium of claim 11, wherein the one or more pattern matches for all of the portion of the plurality of regular patterns are identified in a single pass of the input data.

14. The non-transitory computer readable medium of claim 11, wherein:
the plurality of instructions of each thread of the plurality of threads corresponds to a subset of a plurality of commands of a common automaton, wherein
generating the plurality of threads comprises generating the plurality of threads based on the common automaton.

15. The non-transitory computer readable medium of claim 11, wherein the common automaton merges one or more portions of the plurality of regular patterns, such that instructions of one or more threads of the plurality of threads comprise at least one fork instruction for generating one or more additional threads based upon matching a current symbol of the input data.

16. The non-transitory computer readable medium of claim 11, wherein a first transformation chain of the at least one transformation chain transforms each of the set of regular patterns from a single byte encoding to a multiple byte encoding.

17. The non-transitory computer readable medium of claim 11, wherein applying, for each symbol of the input data, comprises applying each symbol of an incoming stream of the input data, wherein
the input data is larger than a non-transitory computer readable storage region accessible for performing the instructions.

18. The non-transitory computer readable medium of claim 11, wherein a portion of the set of regular patterns comprises at least one operator representing variable combinations of symbols.

19. The non-transitory computer readable medium of claim 11, wherein each thread of the plurality of threads tracks a start of a matched pattern within the input data, and an end of the matched pattern within the input data.

20. The non-transitory computer readable medium of claim 19, wherein each thread of the plurality of threads further tracks an index for flagging a state comprising two or more potential transitions.

* * * * *